US012630181B2

(12) United States Patent
　　Suplin et al.

(10) Patent No.:　US 12,630,181 B2
(45) Date of Patent:　May 19, 2026

(54) VEHICLE CONTROL COMBINING NEURAL NETWORK AND PHYSICS PREDICTION

(71) Applicant: GM GLOBAL TECHNOLOGY OPERATIONS LLC, Detroit, MI (US)

(72) Inventors: Vladimir Suplin, Modi'in Makabim-Re'ut (IL); Avshalom Suissa, Ganei Tikva (IL); Oded Yechiel, Rishon LeZion (IL); Reza Zarringhalam, Whitby (CA); Lapo Frascati, Pavia (IT); Giulio Boni, Scandicci (IT)

( * ) Notice: Subject to any disclaimer, the term of this patent is extended or adjusted under 35 U.S.C. 154(b) by 54 days.

(21) Appl. No.: 18/764,041

(22) Filed: Jul. 3, 2024

(65) Prior Publication Data

US 2026/0008478 A1　Jan. 8, 2026

(51) Int. Cl.
　　*B60W 60/00*　　(2020.01)
　　*B60W 40/107*　　(2012.01)
　　(Continued)

(52) U.S. Cl.
　　CPC ........ *B60W 60/001* (2020.02); *B60W 40/107* (2013.01); *B60W 40/109* (2013.01);
　　(Continued)

(58) Field of Classification Search
　　CPC ............. B60W 60/001; B60W 40/107; B60W 40/109; B60W 40/114; B60W 2710/0666;
　　(Continued)

(56) References Cited

U.S. PATENT DOCUMENTS

| 10,829,149 B1 * | 11/2020 | Garimella | .............. | B62D 6/001 |
| 11,651,216 B2 * | 5/2023 | Dalli | ...................... | G06N 3/082 |
| | | | | 706/15 |

(Continued)

FOREIGN PATENT DOCUMENTS

| DE | 102007039691 A1 * | 2/2009 | ........... | F02D 35/024 |

OTHER PUBLICATIONS

"Li, Qianying; Grey-Box System Identification of a Quadrotor Unmanned Aerial Vehicle; Aug. 20, 2014; Delft University of Technology" (Year: 2014).*

(Continued)

*Primary Examiner* — Ramya P Burgess
*Assistant Examiner* — Christopher R Cardimino
(74) *Attorney, Agent, or Firm* — Ingrassia Fisher & Lorenz, LLP | IF&L

(57)　　　　ABSTRACT

In exemplary embodiments, methods and systems are provided that include one or more sensors of a vehicle and a processor of the vehicle. The one or more sensors are configured to obtain sensor data as to operation of the vehicle. The processor is coupled to the one or more sensors, and is configured to at least facilitate inputting the sensor data into a grey-box model including a neural network model for the forces acting on the vehicle and a physics-based model for body motion of the vehicle; determining a trajectory of the vehicle, using the grey-box model; determining a control action for the vehicle, based on the grey-box model using the sensor data; and executing the control action for the vehicle, in accordance with instructions provided by the processor.

20 Claims, 6 Drawing Sheets

(51) Int. Cl.
    *B60W 40/109*      (2012.01)
    *B60W 40/114*      (2012.01)
    *G06N 3/045*      (2023.01)

(52) U.S. Cl.
    CPC ........... *B60W 40/114* (2013.01); *G06N 3/045*
      (2023.01); *B60W 2710/0666* (2013.01); *B60W*
      *2710/083* (2013.01); *B60W 2710/18* (2013.01);
      *B60W 2710/207* (2013.01)

(58) Field of Classification Search
    CPC ....... B60W 2710/083; B60W 2710/18; B60W
      2710/207; G06N 3/045
    See application file for complete search history.

(56)        References Cited

U.S. PATENT DOCUMENTS

| | | | |
|---|---|---|---|
| 2019/0071084 A1* | 3/2019 | Tuncali | ............... B60W 30/165 |
| 2021/0048785 A1* | 2/2021 | Drees | ................... G05B 13/027 |
| 2021/0053616 A1* | 2/2021 | Funke | .................. G05D 1/0088 |
| 2022/0215254 A1* | 7/2022 | Look | ........................ G06N 3/08 |
| 2023/0001940 A1* | 1/2023 | Doerr | ..................... G06N 3/094 |
| 2023/0027577 A1* | 1/2023 | Naderhirn | ........... G05D 1/0214 |
| 2023/0079202 A1* | 3/2023 | You | ................... B60W 60/0015 |
| | | | 701/25 |
| 2024/0001928 A1* | 1/2024 | Ghandriz | ................. B60T 1/10 |
| 2024/0019156 A1* | 1/2024 | Mostafavi | ........... G05B 13/027 |

OTHER PUBLICATIONS

"Zhang, Fengqui; Hu, Xiaosong; Liu, Teng; Xu,, Kanghui; Duan, Ziwen; Pang, Hui; Computationally Efficient Energy Management for Hybrid Electric Vehicles Using Model Predictive Control and Vehicle-to-Vehicle Communication; Dec. 17, 2020; IEEE" ( Year: 2020).*

\* cited by examiner 207
602
604
606
608
610
612
FIG. 6
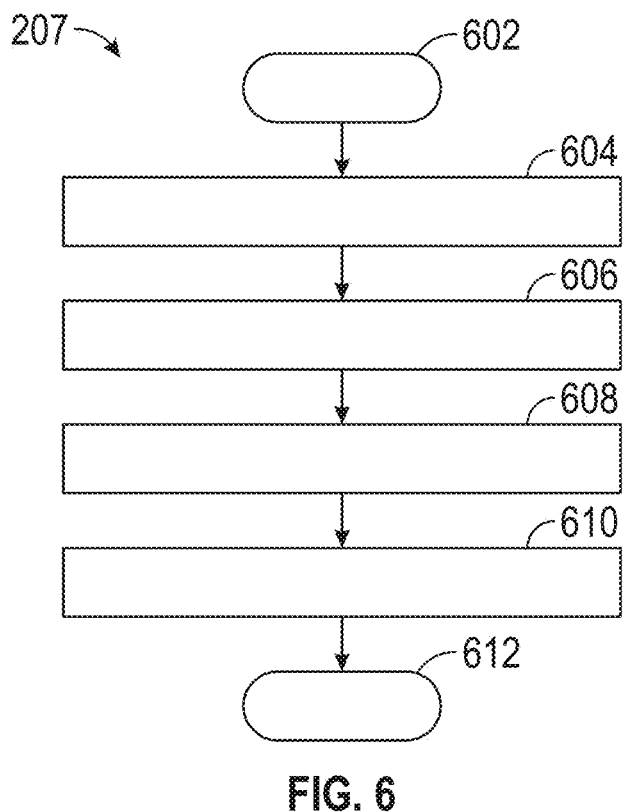
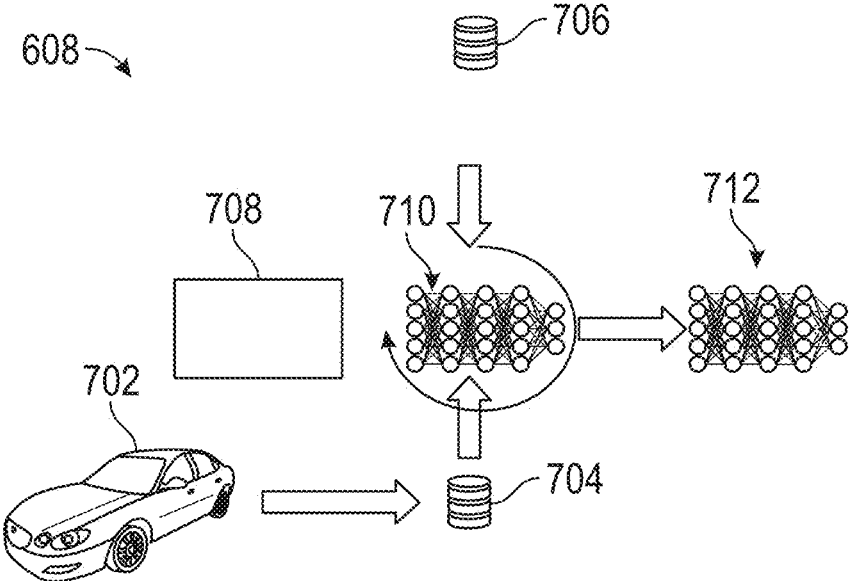
706
708
710
712
702
704
FIG. 7

VEHICLE CONTROL COMBINING NEURAL NETWORK AND PHYSICS PREDICTION

INTRODUCTION

The technical field generally relates to platforms such as vehicles and, more specifically, to methods and systems for controlling vehicles, including the control of braking, steering, and torque based on vehicle trajectory.

Many vehicles today utilize techniques for monitoring vehicle trajectory and for controlling a vehicle based on the trajectory. However, in certain situations, such techniques may not always be optimal.

Accordingly, it is desirable to provide improved methods and systems for controlling vehicles, including based on vehicle trajectory. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes obtaining, via one or more sensors of a vehicle, sensor data as to operation of the vehicle; inputting the sensor data into a grey-box model including a neural network model for the forces acting on the vehicle and a physics-based model for body motion of the vehicle, via a processor of the vehicle; determining, via the processor, a trajectory of the vehicle, using the grey-box model; determining, via the processor, a control action for the vehicle, based on the grey-box model using the sensor data; and executing the control action for the vehicle, in accordance with instructions provided by the processor.

Also in an exemplary embodiment, the control action includes one or more of the following: application of a steering angle for the vehicle, application of a braking torque for the vehicle, or application of a propulsion motor torque for the vehicle.

Also in an exemplary embodiment, the control action includes each of the following: application of the steering angle for the vehicle, application of the braking torque for the vehicle, and application of the propulsion motor torque for the vehicle.

Also in an exemplary embodiment, the neural network model pertains to vehicle to ground interaction between a plurality of wheels of the vehicle and a ground of a roadway on which the vehicle is travelling; and the neural network model is updated based on application of the physics-based model.

Also in an exemplary embodiment, the neural network model includes a Jacobian matrix that includes a gradient matrix that is configured to improve efficiency for the neural network model and therefore to improve control of the vehicle.

Also in an exemplary embodiment, the neural network model is trained used the grey-box model along with vehicle simulation data and vehicle test data.

Also in an exemplary embodiment, the; method further includes developing model based control for the vehicle, based on a linear time varying (LTV) approximation of the grey-box model.

Also in an exemplary embodiment, the physics-based model is implemented by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods including one or more model predictive control (MPC) methods, linear quadratic regulator (LQR) methods, or iterative linear quadratic regulator (iLQR) methods.

Also in an exemplary embodiment, the physics-based model is implemented by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods including each of the following: one or more model predictive control (MPC) methods, one or more linear quadratic regulator (LQR) methods, and one or more iterative linear quadratic regulator (iLQR) methods.

In another exemplary embodiment, a system is provided that includes one or more sensors of a vehicle and a processor of the vehicle. The one or more sensors are configured to obtain sensor data as to operation of the vehicle. The processor is coupled to the one or more sensors, and is configured to at least facilitate inputting the sensor data into a grey-box model including a neural network model for the forces acting on the vehicle and a physics-based model for body motion of the vehicle; determining a trajectory of the vehicle, using the grey-box model; determining a control action for the vehicle, based on the grey-box model using the sensor data; and executing the control action for the vehicle, in accordance with instructions provided by the processor.

Also in an exemplary embodiment, the control action includes one or more of the following: application of a steering angle for the vehicle, application of a braking torque for the vehicle, or application of a propulsion motor torque for the vehicle.

Also in an exemplary embodiment, the control action includes each of the following: application of the steering angle for the vehicle, application of the braking torque for the vehicle, and application of the propulsion motor torque for the vehicle.

Also in an exemplary embodiment, the neural network model pertains to vehicle to ground interaction between a plurality of wheels of the vehicle and a ground of a roadway on which the vehicle is travelling; and the neural network model is updated based on application of the.

Also in an exemplary embodiment, the neural network model includes a Jacobian matrix that includes a gradient matrix that is configured to improve efficiency for the neural network model and therefore to improve control of the vehicle.

Also in an exemplary embodiment, the neural network model is trained using the grey-box model along with vehicle simulation data and vehicle test data.

Also in an exemplary embodiment, the processor is further configured to at least facilitate developing model based control for the vehicle, based a linear time varying (LTV) approximation of the grey-box model.

Also in an exemplary embodiment, the processor is further configured to at least facilitate implementing the physics-based model by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods including one or more model predictive control (MPC) methods, linear quadratic regulator (LQR) methods, or iterative linear quadratic regulator (iLQR) methods.

Also in an exemplary embodiment, the processor is further configured to at least facilitate implementing the physics-based model by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods including each of the following: one or more model predictive control (MPC) methods, one or more linear quadratic regulator (LQR) methods, and one or more iterative linear quadratic regulator (iLQR) methods.

In another exemplary embodiment, a vehicle is provided that includes a body, a drive, system, a steering system, a braking systems, and a processor. The drive system, the steering system, and the braking system are configured to control movement of the body. The one or more sensors are configured to obtain sensor data as to operation of the vehicle. The processor is coupled to the one or more sensors, and is configured to at least facilitate inputting the sensor data into a grey-box model including a neural network model for the forces acting on the vehicle and a physics-based model for body motion of the vehicle; determining a trajectory of the vehicle, using the grey-box model; determining a control action for movement of the vehicle via one or more of the drive system, steering system, and braking system, based on the grey-box model using the sensor data; and executing the control action for the vehicle, in accordance with instructions provided by the processor.

Also in an exemplary embodiment, the neural network model pertains to vehicle to ground interaction between a plurality of wheels of the vehicle and a ground of a roadway on which the vehicle is travelling; the neural network model updated based on application of the physics-based model; the neural network model includes a Jacobian matrix that includes a gradient matrix that is configured to improve efficiency for the neural network model and therefore to improve control of the vehicle; the neural network model is trained used the grey-box model along with vehicle simulation data and vehicle test data; the processor is further configured to at least facilitate model based control for the vehicle, based a linear time varying (LTV) approximation of the grey-box model; and the processor is further configured to at least facilitate implementing the physics-based model by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods including one or more model predictive control (MPC) methods, linear quadratic regulator (LQR) methods, or iterative linear quadratic regulator (iLQR) methods.

DESCRIPTION OF THE DRAWINGS

The present disclosure will hereinafter be described in conjunction with the following drawing figures, wherein like numerals denote like elements, and wherein:

FIG. 6 is an illustration of an exemplary implementation of a step of the process of FIG. 2, namely the training of a neural network model for the forces acting on the vehicle, in accordance with exemplary embodiments; and FIG. 7 is an illustration of an exemplary implementation of a sub-step of the step of FIG. 6 and the process or FIG. 2, namely, the training and testing of the neural network model.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
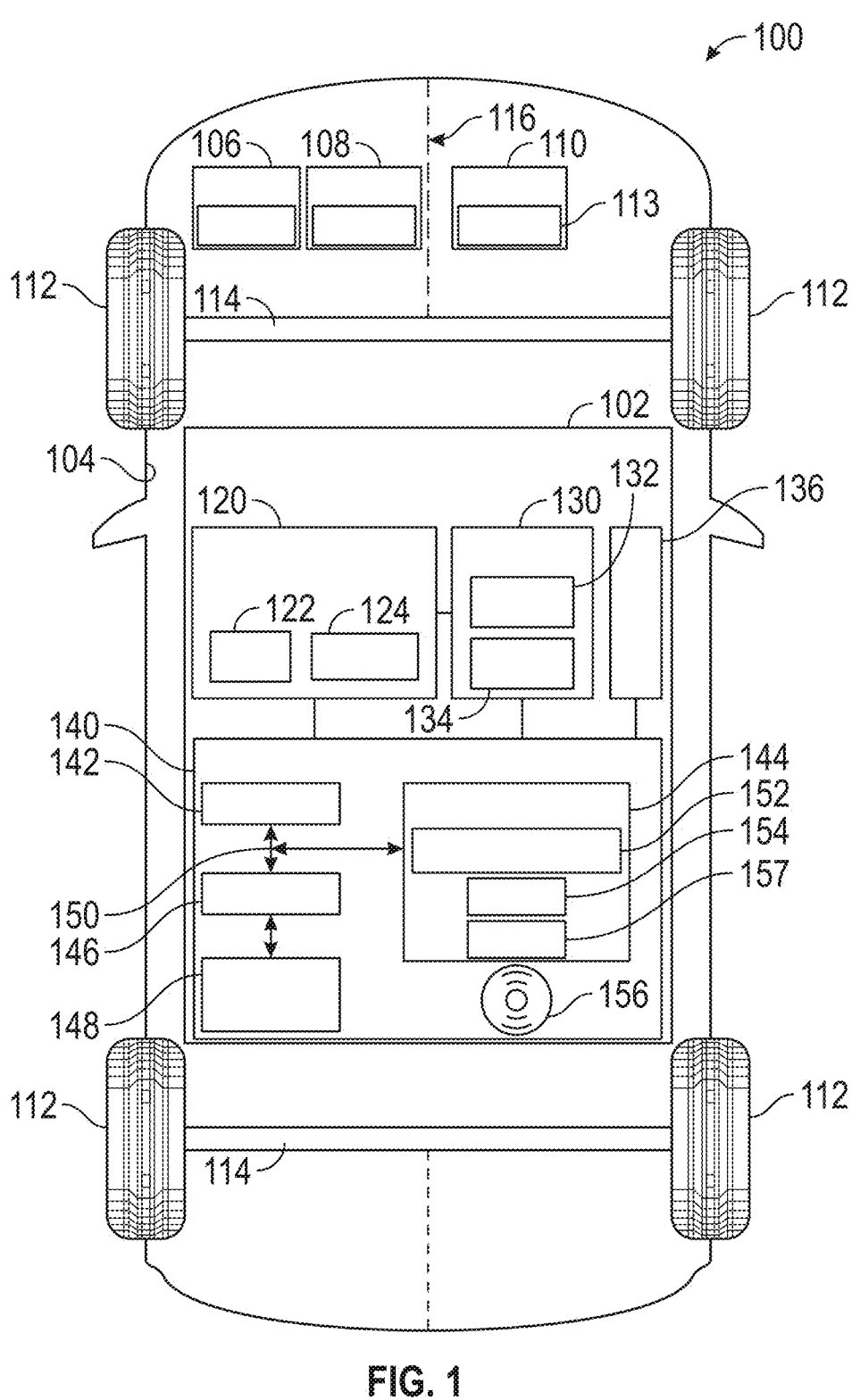
FIG. 1 is a functional block diagram of a vehicle that includes a control system for controlling a vehicle, including based on vehicle trajectory, using a network model for the forces acting on the vehicle and a physics-based model for body motion of the vehicle, in accordance with exemplary embodiments.

FIG. 1 illustrates a vehicle 100, according to an exemplary embodiment. As described in greater detail further below, the vehicle 100 includes, among other components, a control system 102 for controlling a vehicle, including based on vehicle trajectory, using a neural network and a physics-based model for body motion of the vehicle, in accordance with exemplary embodiments. As described in greater detail further below in connection with FIG. 1 as well as the process 200 of FIG. 2 and the implementations of FIGS. 3-7, in various embodiments the control system 102 utilizes a neural network and a physics-based model for body motion of the vehicle in controlling braking, steering, torque, and other aspects of vehicle movement and control actions based on trajectory, including a non-linear trajectory of the vehicle 100 in various circumstances.

In various embodiments, the vehicle 100 comprises an automobile, such as any one of a number of different types of automobiles, such as, for example, a sedan, a wagon, a truck, sport utility vehicle (SUV), or the like. In certain embodiments, the vehicle 100 may also comprise a motor-cycle or other vehicle, such as aircraft, spacecraft, watercraft, and so on, and/or one or more other types of mobile platforms (e.g., a robot and/or another mobile platform).

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks, motorcycles, and certain other vehicles).

A drive system 110 is mounted on the chassis 116, and drives the wheels 112, for example via axles 114. In certain embodiments, the drive system 110 comprises a propulsion system having a motor 113 (e.g. that includes, in various embodiments, one or more combustion engines, electric motors, or the like).

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a brake pedal 107) and/or automatically via a control system (such as the control system 102 and/or one or more other control systems).

Also in exemplary embodiments, the steering system 108 controls steering of the vehicle 100 via steering components that are controlled via inputs provided by a driver (e.g., via a steering wheel 109), and/or automatically via a control system (such as the control system 102 and/or one or more other control systems).

Figure 2:
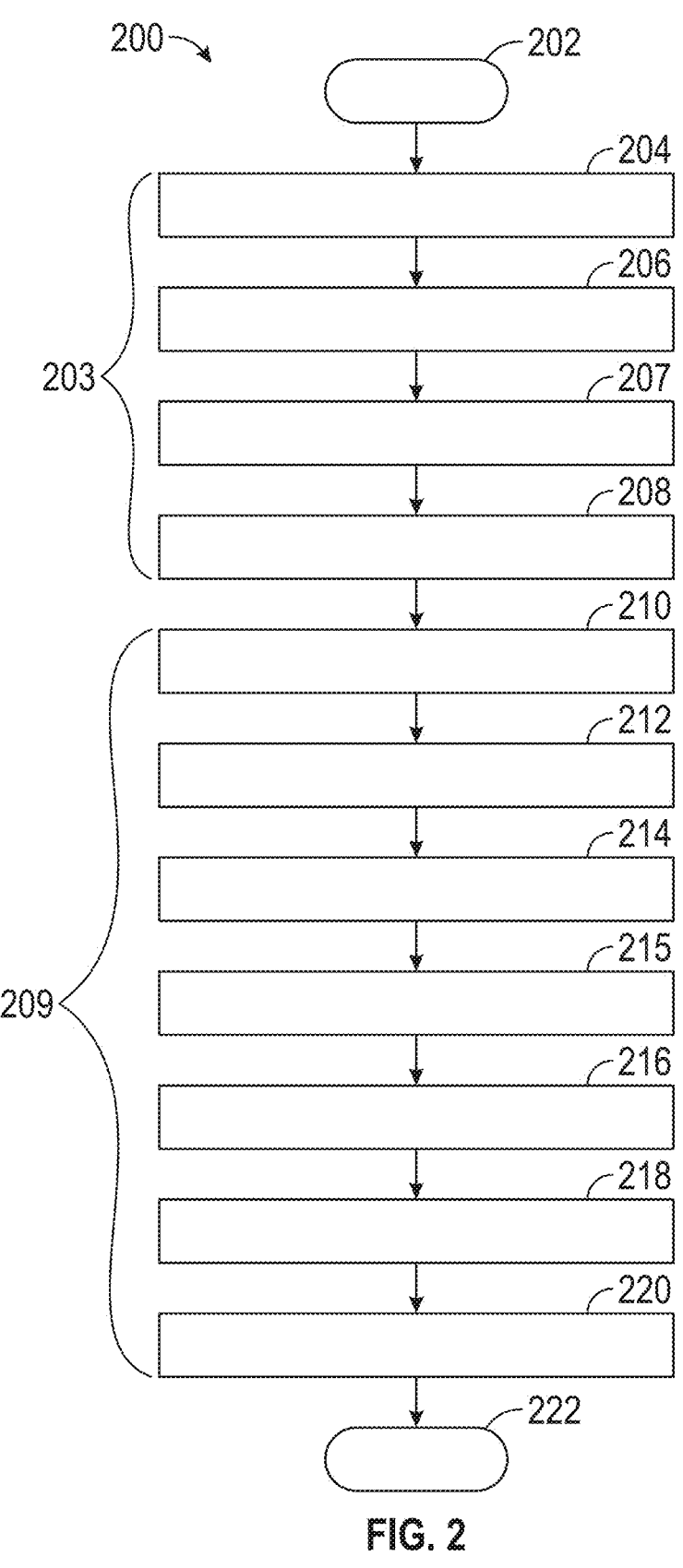
FIG. 2 is a flowchart of a process for controlling a vehicle, including based on vehicle trajectory, using a network model for the forces acting on the vehicle and a physics-based model for body motion of the vehicle, and that can be implemented in connection with the vehicle of FIG. 1, in accordance with exemplary embodiments.

In the embodiment depicted in FIG. 1, the control system 102 is coupled to the braking system 106, the steering system 108, and the drive system 110, and controls operation and functionality thereof. Also in various embodiments, the control system 102 provides for control of the vehicle using a neural network and a physics-based model for body motion of the vehicle, in accordance with the process 200 as depicted in FIG. 2 and the implementations of FIGS. 3-7 and as described further below in connection therewith.

Also as depicted in FIG. 1, in various embodiments, the control system 102 includes a sensor array 120, a display 130, a location system 136, and a controller 140, as described in greater detail below.

In various embodiments, the sensor array 120 includes various sensors that obtain sensor data as to operation of the vehicle 100 and its trajectory. In various embodiments, the sensor array 120 includes various inertial measurement unit (IMU) sensors 122 (e.g., including among sensors, various velocity sensors, accelerometers, gyroscopes, torque sensors, steering angle and/or wheel angle sensors, and so on). In certain embodiments, the sensor array 120 may also include one or more other sensors 124, such as one or more input sensors and/or one or more other sensors that measure other vehicle and/or environmental parameters.

In various embodiments, the display 130 provides information and instructions, among other content, for passengers of the vehicle 100 (including, in various embodiments, a driver as well as other passengers of the vehicle 100). As depicted in FIG. 1, in various embodiments, the display 130 includes an audio component 132 (including one or more speakers) for displaying audio instructions and other information and content for the passengers, in addition to a visual (or video) component 134 (including one or more display screens) for displaying visual instructions and other information and content for the passengers.

Also in various embodiments, the location system 136 obtains information as to a geographic location and position of the vehicle 100. In certain embodiments, the location system 136 comprises a navigation system for the vehicle 100. Also in certain embodiments, the location system 136 comprises a satellite-based location system, such as a global positioning system (GPS) system and/or other satellite-based system.

In various embodiments, the controller 140 is coupled to the sensor array 120, the display 130, and the location system 136. Also in various embodiments, the controller 140 receives sensor data from the sensor array 120 (and in certain embodiments also location data from the location system 136), interprets and processes the sensor data (and in certain embodiments also the location data), and provides instructions and other information and content based thereon via the display 130. Also in various embodiments, the controller 140 controls various vehicle actions (e.g., including braking, steering, drive torque, and so on), including based on a calculated trajectory of the vehicle 100 based on the sensor data (and in certain embodiments based also on the location data). In various embodiments, the controller 140 is further coupled to the braking system 106, steering system 108, and drive system 110, among various other vehicle components (e.g., including a navigation system, navigation system, and other non-depicted components) and controls operation thereof.

In various embodiments, the controller 140 provides these functions in accordance with the steps of the process 200 that is depicted in FIG. 2 and described in greater detail further below in connection therewith and further in connection with the implementations of FIGS. 3-7, also a described in greater detail further below.

As depicted in FIG. 1, in various embodiments, the controller 140 comprises a computer system (also referred to herein as computer system 140), and includes a processor 142, a memory 144, an interface 146, a storage device 148, and a computer bus 150.

The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and implementations of FIGS. 3-7 and as described further below in connection therewith.

The memory 144 can be any type of suitable memory, including various types of non-transitory computer readable storage medium. In certain examples, the memory 144 is located on and/or co-located on the same computer chip as the processor 142. In the depicted embodiment, the memory 144 stores the above-referenced program 152 along with a neural network model 154 and stored values 157 (e.g., look-up tables, thresholds, and/or other values with respect to the process 200).

The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and implementations of FIGS. 3-7 and as described further below in connection therewith. In another exemplary embodiment, the program product may be directly stored in and/or otherwise accessed by the memory 144 and/or a disk (e.g., disk 156), such as that referenced below.

The bus 150 serves to transmit programs, data, status and other information or signals between the various components of the computer system of the controller 140. The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program.

FIG. 2 is a flowchart of a process 200 for controlling a vehicle, including based on vehicle trajectory, using a neural network and a physics-based model for body motion of the vehicle, in accordance with an exemplary embodiment. In various embodiments, the process 200 can be implemented in connection with the vehicle 100 of FIG. 1, including the control system 102 thereof. The process will also be described further below in connection with FIGS. 3-7, which depict exemplary illustrations of certain steps of the process 200.

As depicted in FIG. 2, in various embodiments the process 200 begins at 202. In various embodiments, the process 200 begins, at least in an initial iteration, before the vehicle 100 is driven by the user in a current vehicle drive. Also in various embodiments, the process 200 begins with a first sub-process 203 before (comprising steps 204-208, as depicted in FIG. 2 and described below) before the current vehicle drive.

Figure 4:
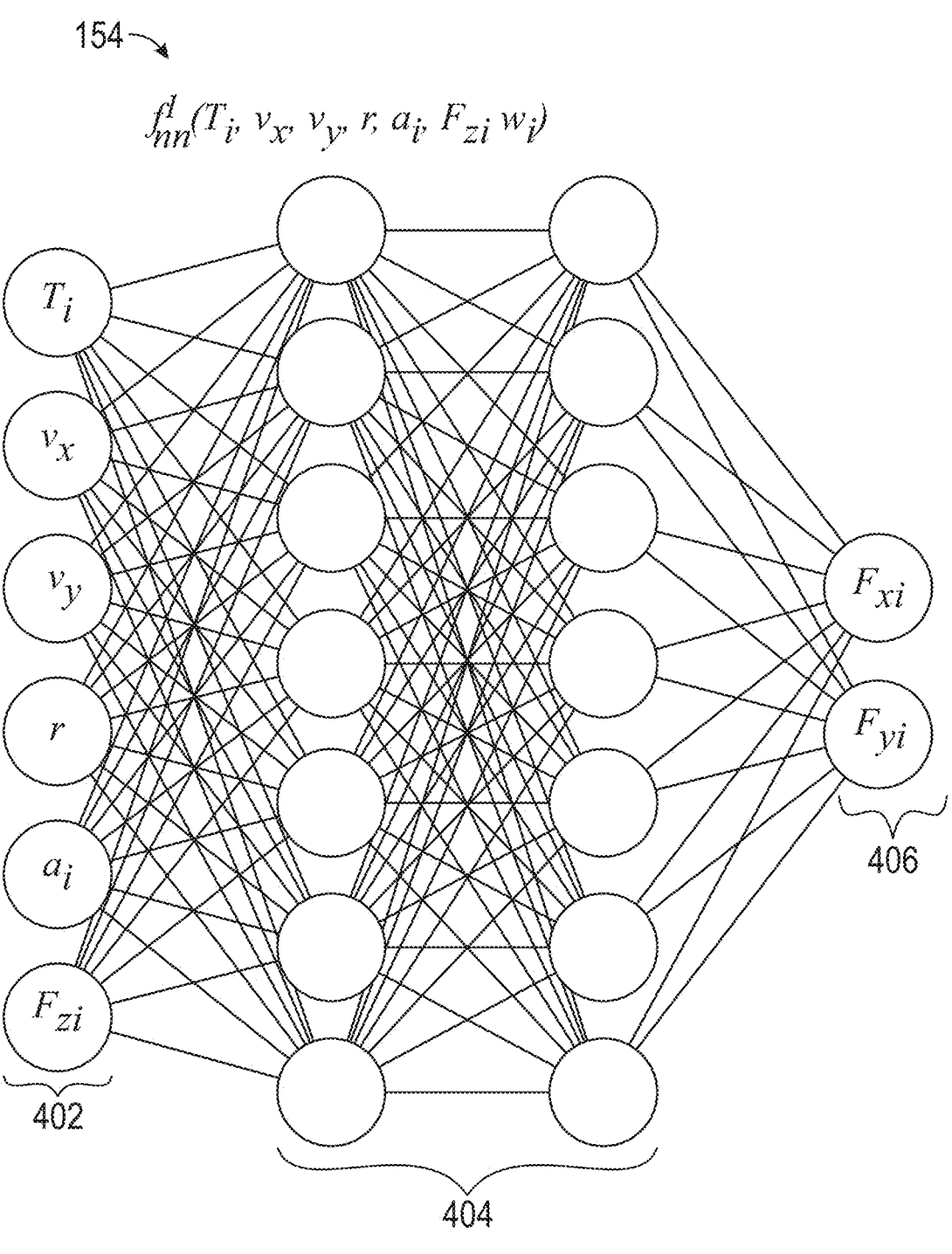
FIG. 4 is an illustration of an exemplary neural network that can be implemented in connection with the process of FIG. 2, in accordance with exemplary embodiments.

In various embodiments, a neural network model for the forces acting on the vehicle is designed (step 204). In various embodiments, the neural network model is designed via a processor (such as the processor 142 of FIG. 1) with respect to vehicle-ground interaction, including interaction between the wheels 112 of the vehicle 100 of FIG. 1 (or tires coupled thereto) and a ground of the roadway or path in with the vehicle 100 travels. Also in various embodiments, the design of the neural network model includes defining a neural network structure and a size for the application for the neural network model. An exemplary neural network model is depicted in FIG. 4, and will be described in greater detail further below in connection therewith.

In various embodiments, the development of the network model for the forces acting on the vehicle (and the physics-based model for body motion of the vehicle, described below) are utilized to calculate the trajectory and the rate of trajectory for the vehicle 100 for various situations, including situations of extreme maneuvers that involve high lateral acceleration and/or yaw rates, and including situations in which vehicle behavior may be close to or approaching applicable handling limits, and/or in which handling and/or the trajectory of the vehicle 100 is non-linear in nature.

Figure 5:
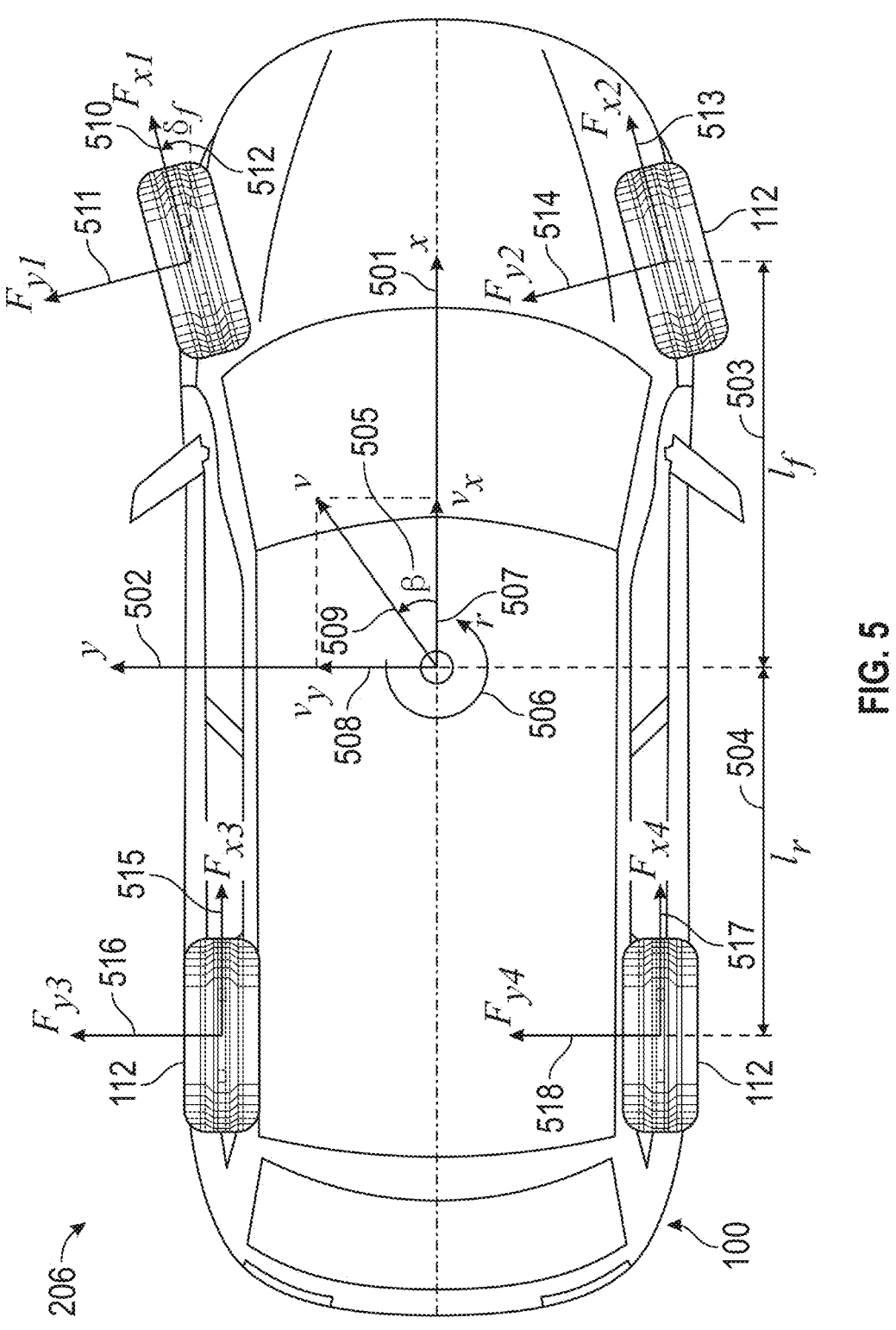
FIG. 5 is an illustration of an exemplary implementation of a step of the process of FIG. 2, namely the developing of a physics-based model for body motion of the vehicle, in accordance with exemplary embodiments.

In various embodiments, a physics-based model for body motion of the vehicle is developed (step 206). In various embodiments, the physics-based model is developed via a processor (such as the processor 142 of FIG. 1). Also in various embodiments, the physics-based model takes the outputs of the neural network model and estimates the vehicle 100's longitudinal, lateral, and yaw angular accelerations. In various embodiments, the hybrid model (i.e., using the neural network model and the physics-based model) allows the usage of model-based control methods, such as model predictive control (MPC), iterative quadratic regular (LQR), and iterative linear quadratic regulator (iLQR). An exemplary implementation of the development of a physics-based model is depicted in FIG. 5, and will be described in greater detail further below in connection therewith.

In various embodiments, training is performed for the neural network model (step 207). In various embodiments, the neural network model is trained using a grey-box model that comprises the physics-based model as implemented in combination with the neural network model. Also in various embodiments, the training of the neural network model is performed by the processor 142 of FIG. 1 using the brey-box model along with simulation data for the vehicle 100 along with vehicle test data. Also in various embodiments, the neural network model is validated by evaluating the performance of the neural network model with test data and through simulation or in-vehicle testing under various different driving scenarios (e.g., using different vehicle parameters and different vehicle environmental conditions, and so on). An exemplary implementation of the training of the neural network model is depicted in FIG. 6, and will be described in greater detail further below in connection therewith.

In various embodiments, model-based control is developed for the vehicle (step 216). In various embodiments, the processor 142 of FIG. 1 develops the model based control using linear time development (LTV) approximation of the above-discussed grey-box model. In various embodiments, the model-based control includes both (1) an optimization algorithm; and (2) a model of the vehicle 100.

As depicted in FIG. 2, in various embodiments, the process 200 continues with a second sub-process 203 (comprising steps 210-220, described below) during the current vehicle drive, in which the neural network model, the physics-based model, and the resulting grey-box model and model-based control are utilized in controlling vehicle actions including steering, braking, and motor torque.

In various embodiments, sensor data is obtained (step 210). In various embodiments, the sensor data includes inertial measurement sensor data from the IMU 122 of FIG. 1. In various embodiments, the sensor data includes accelerations, velocities, angular rates, and coordinates of the vehicle 100.

Also in various embodiments, the sensor data is applied to the model (step 212). In various embodiments, the sensor data is applied to the above-described grey-box model that is a hybrid model, combining the above-described neural network model and physics-based model. In various embodiments, this is performed via the processor 142 of FIG. 1, and results in outputted values of the initial state (x) of the vehicle 100 along with ground forces (F) between the vehicle 100 and the ground of the roadway in which the vehicle 100 is travelling.

In various embodiments, a reference trajectory is obtained (step 214) along with constraints for the vehicle 100 (step 215). In various embodiments, these values are received by the processor 142 of FIG. 1 based on previous data values (e.g., from a prior iteration of the process 200) and/or stored value 157 that are stored in the memory 144 for the vehicle 100.

In various embodiments, outputs of the model of step 212, along with the reference trajectory of step 214 and the constraints of step 215, are provided to the model predictive control (MPC) for processing (step 216).

In various embodiments, the MPC utilizes an initial state of the vehicle (e.g., using the physics-based model), and optimizes the performance criteria for the neural network model for a predetermined number of steps. In various embodiments, the MPC starts with the initial state of the vehicle (e.g., in an initialization mode) and performs efficient optimization of the model at each time stamp (thereby optimizing performance criteria). Accordingly, in various embodiments in which the MPC is performed in a cyclic manner, a determination is made as to the new state of the vehicle. In various embodiments, the new state of the vehicle 100 is then utilized as the "initial state" in the next iteration of the model, and the model is then run from there using an optimization algorithm you optimize performance criteria. In various embodiments, the first step of the control sequence of the vehicle is then applied, and the process continues. In various embodiments, this flow corresponds to a receding horizon control—in which the model optimizes a predefined horizon, and then is updated each step and updated for the various subsequent steps, and so on. In various embodiments, this allows for the building of the optimization criteria in an efficient manner, with an efficient usage of computational and other resources.

Also in various embodiments, the MPC, via the processor 142 of FIG. 1, utilizes the various inputs from steps 212, 214, and 215 in order to determine control commands for the vehicle 100 based on the trajectory of the vehicle 100 (step 218). In various embodiments, the control commands comprise braking, steering, and propulsion torque commands for the vehicle 100 based on the vehicle trajectory.

Also in various embodiments, the control commands are implemented (step 220). Specifically, in various embodiments, the control commands of step 218 are implemented in step 220 via the applicable vehicle systems (such as the braking system 106, the steering system 108, and the drive system 110 of FIG. 1) in implemented instructions thereto that are provided by the processor 142 based on the determinations of the process 200 of FIG. 2, including the determinations of steps 216 and 218.

In various embodiments, the process 200 then terminates at step 222.

Figure 3:
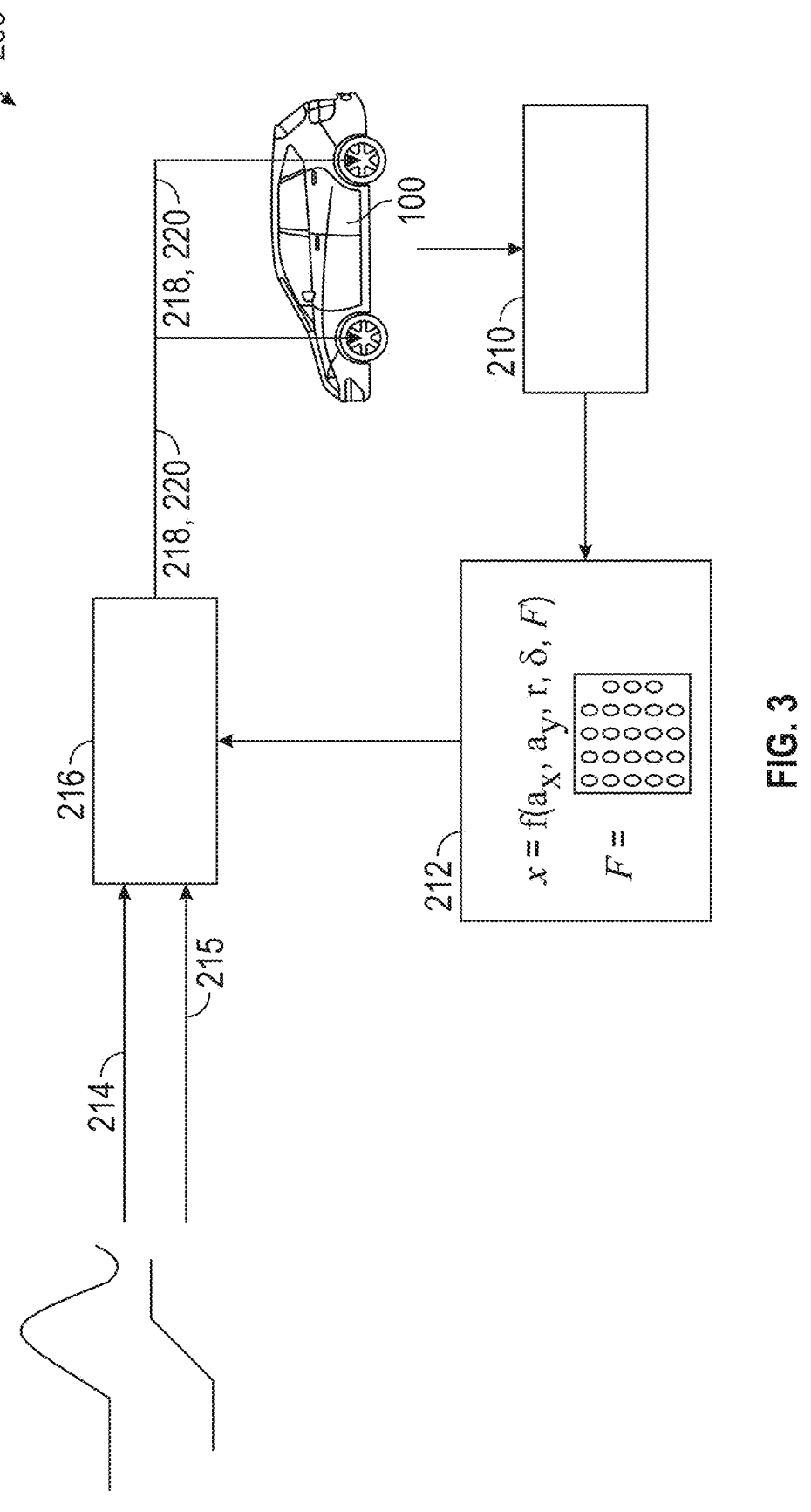
FIG. 3 is an illustration of a sub-process of the process of FIG. 2, including implementation in a vehicle during a current vehicle drive, in accordance with exemplary embodiments.

With reference to FIG. 3, is an illustration is provided of the sub-process 209 of the process 200 of FIG. 3, including implementation in the vehicle 100 during a current vehicle drive, in accordance with exemplary embodiments. As depicted in FIG. 3, in an exemplary embodiment, the sensor data is collected in step 210 (e.g., from the IMU 122 of FIG. 1) and provided to the grey-box model in step 212 (in which values are determined, including for an initial state (X) for the vehicle and forces (F) of interaction between the wheels 112 of the vehicle 100 and the ground of the roadway in which the vehicle 100 is travelling. Also as depicted in FIG. 3, a reference trajectory and vehicle constraints are both obtained (steps 214 and 215, respectively), and these values are provided along with the grey-box model determinations of step 212 into the MPC (step 216). As shown in FIG. 3, the determinations of the MPC of step 216 are utilized in determining and providing control actions for the vehicle 100 (steps 218 and 220), including for steering angles, engine torque, and braking torques for the vehicle 100. Also as depicted in FIG. 3, in certain embodiments the actions of steps 218 and 220 are then used to generate new and/or updated sensor data in a new iteration of the sensor data in a new iteration of step 210 as the process repeats in a new iteration, and so on. In certain embodiments, information and/or displays of the control action are also provided for the driver and/or other passengers of the vehicle 100 via the display 130 of FIG. 1 (e.g., including audio, visual, haptic, and/or other notifications of the control actions), in accordance with instructions provided by the processor 142.

FIG. 4 is an illustration of an exemplary neural network model 154 that can be implemented in connection with the process 200 of FIG. 2, in accordance with exemplary embodiments. As depicted in FIG. 4, in various embodiments, the neural network model 154 includes at least four layers, including an input layer 402, multiple internal processing layers 404, and an output layer 406. In various embodiments, the input layer 402 includes input features that include driving and braking torques, normal loads, slip angles, chassis velocities, and yaw rate (e.g., as determined via the IMU 122 of FIG. 1). Also in various embodiments, the neural network model 154 includes a network architecture with four neural network mappings. In addition, in various embodiments, the neural network model 154 includes a network configuration that includes various different layers and neurons, along with an activation function and a training algorithm. In various embodiments, the neural network model 154 comprises a vehicle-ground interaction data-driven model, and is stored in the memory 144 of the vehicle 100 as depicted in FIG. 1. Also in various embodiments, the neural network model 154 includes a Jacobian matrix (i.e., a gradient matrix) to improve efficiency for the neural network model 154 and therefore to improve control of the vehicle 100.

Also in certain embodiments, the neural network model 154 comprises a vehicle-ground interaction data-driven model that is represented in the following equation (Equation 1):

$$\begin{pmatrix} F_{xi} \\ F_{yi} \end{pmatrix} = f_{nn}^{i}(T_i, v_x, v_y, r, \alpha_i, F_{zi}; w_i), \text{ for } i = 1, 2, 3, 4, \qquad \text{(Equation 1)}$$

in which $$f_{nn}^{i}$$

represent neural networks-based models.

FIG. 5 is an illustration of an exemplary implementation of step 206 of the process 200 of FIG. 2, namely the developing of a physics-based model for body motion of the vehicle, in accordance with exemplary embodiments. In various embodiments, Newtonian principles are applied for chassis dynamics of the vehicle 100. Also in various embodiments, trigonometric equations are used for chassis kinematics for the vehicle 100. In addition, also in various embodiments, the physics-based model may be extended as part of step 206 by adding actuator models to the physics-based model.

In various embodiments, as depicted in FIG. 5, in various embodiments as part of step 206, force is applied to each corner of the vehicle 100, namely to respective wheels 112 at each corner of the vehicle 100, that interact with a ground of the roadway in which the vehicle 100 is travelling.

As depicted in FIG. 5, in various embodiments, an X-axis 501 and a Y-axis 502 are depicted across the vehicle 100 (e.g., with the X-axis 501 extending across the vehicle 100 in a first direction from rear to front of the vehicle 100, and with the Y-axis 502 extending across the vehicle 100 in a second direction, perpendicular direction, from passenger side to driver side of the vehicle 100). Also as depicted in FIG. 5, a first length (or front length) 503 ($l_f$) is depicted between a front wheel 112 and a center of the vehicle 100, whereas a second length (or rear length) 504 ($l_r$) is depicted between a rear wheel 112 and the center of the vehicle 100. Also as depicted in FIG. 5, a steering angle β 504 is provided for the vehicle 100, along with respective velocities that include a first velocity $V_x$ 507 along the X-axis 501, a second velocity $V_y$ along the Y-axis 502, and a direction velocity V 509 along the steering angle β 504.

As depicted in FIG. 5, a first torque is applied to a front driver side wheel 112 with first torque components $F_{x1}$ 510 applied along the X-axis 501 and $F_{y1}$ 512 applied along the Y-axis 502, and with a force angle δ 512. Also as depicted in FIG. 5, a second torque is applied to a passenger side wheel 112 with second torque components $F_{x2}$ 513 applied along the X-axis 501 and $F_{Y2}$ 514 applied along the Y-axis 502, and with the same force angle as the front driver side wheel in an exemplary embodiment. In addition, also as depicted in FIG. 5, a third torque is applied to a rear driver side wheel 112 with third torque components $F_{x3}$ 515 applied along the X-axis 501 and $F_{Y3}$ 516 applied along the Y-axis 502, whereas a fourth torque is applied to a rear passenger side wheel 112 with fourth torque components $F_{x4}$ 517 applied along the X-axis 501 and $F_{Y4}$ 518 applied along the Y-axis 502.

In certain embodiments, the physics-based model incorporates the following equations:

$$\dot{v}_x = a_x + rv_y = \tag{Equation 2}$$

$$\frac{F_{x1}\ \cos\ \delta_f - F_{y1}\ \sin\ \delta_f + F_{x2}\ \cos\ \delta_f - F_{y2}\ \sin\ \delta_f + F_{x3} + F_{x4}}{m} + rv_y;$$

$$\dot{v}_y = a_y - rv_x = \tag{Equation 3}$$

$$\frac{F_{y1}\ \cos\ \delta_f + F_{x1}\ \sin\ \delta_f + F_{y2}\ \cos\ \delta_f + F_{x2}\ \sin\ \delta_f + F_{y3} + F_{y4}}{m} - rv_x;$$

$$\tag{Equation 4}$$

$$\dot{r} = \frac{\begin{aligned}&-l_{wr}(F_{x3} - F_{x4}) + l_f(F_{y1}\ \cos\ \delta_f + \\ &F_{y2}\ \cos\ \delta_f + F_{x1}\ \sin\ \delta_f + F_{x2}\ \sin\ \delta_f) - \\ &l_r(F_{y3} + F_{y4}) + l_{wf}(-F_{x1}\ \cos\ \delta_f + \\ &F_{x2}\ \cos\ \delta_f + F_{y1}\ \sin\ \delta_f - F_{y2}\ \sin\ \delta_f)\end{aligned}}{I_{zz}};$$

$$\dot{X} = v_x\ \cos\ \psi - v_y\ \sin\ \psi; \tag{Equation 5}$$

-continued $$\dot{Y} = v_x\ \sin\ \psi + v_y\ \cos\ \psi;\ \text{and} \tag{Equation 6}$$

$$\dot{\psi} = r, \tag{Equation 7}$$

in which "F" represents force, "v" represents velocity, "a" represents acceleration, and the other notations are provided in FIG. 5 and/or related to the discussion above in connection therewith.

In various embodiments, the neural network model (e.g., as developed in connection with the implementation of FIG. 5 and as depicted in FIG. 4 and described in connection therewith) reduces the complicated tire model required for the physics-based model which increases model fidelity and reduces computational complexity.

With reference to FIG. 6, an illustration is provided of an exemplary implementation of step 207 of the process of FIG. 2, namely the training of a neural network model for the forces acting on the vehicle, in accordance with exemplary embodiments. In various embodiments, step 207 begins at 602 as depicted in FIG. 6.

As depicted in FIG. 6, in various embodiments, simulation scenarios are defined for the neural network model (step 604). In various embodiments, the processor 142 of FIG. 1 defines the simulation scenarios to cover various possible driving scenarios for the vehicle, for example including as to various different vehicle parameters and environmental conditions. In various embodiments, the set of scenarios is rich (with many scenarios), in order to provide adequate coverage of the required operation range for the vehicle 100. Also in various embodiments, the simulation scenarios are defined so as to include various vehicle and environmental parameters and change ranges to the same.

Also as depicted in FIG. 6, in various embodiments, the scenario simulations are run (step 606). In various embodiments, the processor 142 of FIG. 1 runs the scenario simulations to include a wide and sweeping range of vehicle and environmental parameters that generate sufficient offline training data for the vehicle 100. In various embodiments, this helps to assure a high level of steady state accuracy for the neural network model.

In addition, as depicted in FIG. 6, in various embodiments the neural network model is trained and tested (step 608). In various embodiments, the training and testing is performed by the processor 142 of FIG. 1 using data that has been gathered during the simulation.

In various embodiments, the training of the neural network model is performed using a loss function, in accordance with the following equations:

$$a_x = \frac{1}{m}\sum_{i=1}^{4}c_{1i}(\delta_f)^T f_{nn}^i(T_i,\ v_x,\ v_y,\ r,\ \alpha_i,\ F_{zi};\ w_i); \tag{Equation 8}$$

$$a_y = \frac{1}{m}\sum_{i=1}^{4}c_{2i}(\delta_f)^T f_{nn}^i(T_i,\ v_x,\ v_y,\ r,\ \alpha_i,\ F_{zi};\ w_i);\ \text{and} \tag{Equation 9}$$

$$\dot{r} = \frac{1}{I_{zz}}\sum_{i=1}^{4}c_{3i}(\delta_f)^T f_{nn}^i(T_i,\ v_x,\ v_y,\ r,\ \alpha_i,\ F_{zi};\ w_i), \tag{Equation 10}$$

wherein "$a_x$" and "$a_y$" represent acceleration in the "x" and "y" directions, respectively, and wherein the "c" values represent suitable parameters.

In certain embodiments, the training loss function can also be expressed in a vector format, in according to the following equation:

$$\underbrace{\begin{pmatrix} a_x \\ a_y \\ \dot{r} \end{pmatrix}}_{y} = \underbrace{\begin{pmatrix} \dfrac{c_{11}(\delta_f)^T}{m} & \dfrac{c_{12}(\delta_f)^T}{m} & \dfrac{c_{13}(\delta_f)^T}{m} & \dfrac{c_{14}(\delta_f)^T}{m} \\ \dfrac{c_{21}(\delta_f)^T}{m} & \dfrac{c_{22}(\delta_f)^T}{m} & \dfrac{c_{23}(\delta_f)^T}{m} & \dfrac{c_{24}(\delta_f)^T}{m} \\ \dfrac{c_{31}(\delta_f)^T}{I_{zz}} & \dfrac{c_{32}(\delta_f)^T}{I_{zz}} & \dfrac{c_{33}(\delta_f)^T}{I_{zz}} & \dfrac{c_{34}(\delta_f)^T}{I_{zz}} \end{pmatrix}}_{M(\delta_f)} \cdot$$    (Equation 11)

$$\underbrace{\begin{pmatrix} f_{nn}^1(T_1, v_x, v_y, r, a_1, F_{z1}; w_1) \\ f_{nn}^2(T_2, v_x, v_y, r, a_2, F_{z2}; w_2) \\ f_{nn}^3(T_3, v_x, v_y, r, a_3, F_{zi}; w_3) \\ f_{nn}^4(T_4, v_x, v_y, r, a_4, F_{z4}; w_4) \end{pmatrix}}_{F_{nn}(p;w)},$$

in which:

"p" is the vector of all network inputs: $T_1$, $T_2$, $T_3$, $T_4$, $V_x$, $V_y$, r, $a_1$, $a_2$, $a_3$, $a_4$, $F_{z1}$, $F_{z2}$, $F_{z3}$, and $F_{z4}$; and "w" is the vector of all network weights: $w_1$, $w_2$, $w_3$, and $w_4$.

Also in various embodiments, the loss function can also be optimized with respect to "w" in accordance with the following equation:

$$\frac{1}{N}\sum_{i=1}^{N}\|y^m - y\|^2 + \lambda_2\|w\|^2 =$$    (Equation 12)

$$\frac{1}{N}\sum_{i=1}^{N}\|y^m - M(\delta_f^m)F_{nn}(p^m; w)\|^2 + \lambda_2\|w\|^2.$$

With reference to FIG. 7, in various embodiments the training and testing of step 608 includes vehicle testing 702 that produces training data 704 for the neural network model. Also as depicted in FIG. 7, in various embodiments, further training and testing 706 is utilized, along with the above-referenced training data 704 form the vehicle testing 702, in performing offline training 708 for the neural network model. In various embodiments. The offline training 708 then yields an updated and trained neural network model 712.

With reference back to FIG. 6, in various embodiments, further training is performed for the neural network model (step 610). In various embodiments, the processor 142 of FIG. 1 provides further training for the updated and trained neural network model 712, including to further train the neural network model for accuracy using data that has been gathered during the vehicle testing. In certain embodiments, step 207 then ends at 612 as depicted in FIG. 6.

Accordingly, methods, systems, and vehicles are provided for control of vehicle actions. As depicted in FIGS. 1-7 and as described above in connection therewith, in various embodiments, the disclosed systems implement a grey-box model that combines a neural network model for the forces acting on the vehicle in combination with a physics-based model for body motion of the vehicle in determining and executing vehicle control actions, including steering angle, braking torque, and engine propulsion torque, based on the trajectories (including non-linear trajectories) of the vehicle 100.

It will be appreciated that the systems, vehicles, and methods may vary from those depicted in the Figures and described herein. For example, the vehicle 100 of FIG. 1, including the control system 102 and/or other components thereof, may vary in different embodiments from that depicted in FIG. 1 and/or described above in connection therewith. It will similarly be appreciated that the steps of the process 200 and implementations thereof may differ from those depicted in FIGS. 2-7, and/or that various steps of the process 200 may occur concurrently and/or in a different order than that depicted in FIGS. 2-7 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining, via one or more sensors of a vehicle, sensor data as to operation of the vehicle;

inputting the sensor data into a grey-box model comprising a neural network model for the forces acting on the vehicle and a physics-based model for body motion of the vehicle, via a processor of the vehicle;

determining, via the processor, a trajectory of the vehicle, using the grey-box model;

determining, via the processor, a control action for the vehicle, based on the grey-box model using the sensor data; and executing the control action for the vehicle, in accordance with instructions provided by the processor;

wherein the neural network model comprises:

an input layer including input features from the sensor data that include each of the following: driving and braking torques, normal loads, slip angles, chassis velocities, and yaw rate as determined by an inertial measurement unit (IMU) of the one or more sensors;

a plurality of processing layers; and an output layer; and wherein the neural network model and the physics-based model are utilized together as a hybrid model by the processor in generating outputted results of an initial state of the vehicle using both the physics-based model along with ground forces between the vehicle and a ground of a roadway in which the vehicle is travelling to generate the outputted results, and the outputted results are utilized by the processor in executing a model predictive control (MPC) for optimizing performance criteria for the neural network model for a predetermined number of steps in a cyclic manner and for executing the control action for movement of the vehicle corresponding to a receding horizon control for the vehicle.

2. The method of claim 1, wherein the control action includes one or more of the following: application of a steering angle for the vehicle, application of a braking torque for the vehicle, or application of a propulsion motor torque for the vehicle.

3. The method of claim 2, wherein the control action includes each of the following: application of the steering angle for the vehicle, application of the braking torque for the vehicle, and application of the propulsion motor torque for the vehicle.

4. The method of claim 1, wherein:

the neural network model pertains to vehicle to ground interaction between a plurality of wheels of the vehicle and a ground of a roadway on which the vehicle is travelling; and the neural network model is updated based on application of the physics-based model.

5. The method of claim 4, wherein the neural network model includes a Jacobian matrix that comprises a gradient matrix that is configured to improve efficiency for the neural network model and therefore to improve control of the vehicle.

6. The method of claim 4, wherein the neural network model is trained used the grey-box model along with vehicle simulation data and vehicle test data based on a loss function including separate equations for lateral acceleration and longitudinal acceleration.

7. The method of claim 6, further comprising developing model based control for the vehicle, based on a linear time varying (LTV) approximation of the grey-box model.

8. The method of claim 4, wherein the physics-based model is implemented by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods comprising one or more model predictive control (MPC) methods, linear quadratic regulator (LQR) methods, or iterative linear quadratic regulator (iLQR) methods.

9. The method of claim 4, wherein the physics-based model is implemented by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods comprising each of the following: one or more model predictive control (MPC) methods, one or more linear quadratic regulator (LQR) methods, and one or more iterative linear quadratic regulator (iLQR) methods.

10. A system comprising:

one or more sensors of a vehicle that are configured to obtain sensor data as to operation of the vehicle, the one or more sensors including an inertial measurement unit (IMU); and a processor of the vehicle, the processor coupled to the one or more sensors and configured to at least facilitate:

inputting the sensor data into a grey-box model comprising a neural network model for the forces acting on the vehicle and a physics-based model for body motion of the vehicle;

determining a trajectory of the vehicle, using the grey-box model;

determining a control action for the vehicle, based on the grey-box model using the sensor data; and executing the control action for the vehicle, in accordance with instructions provided by the processor;

wherein the neural network model comprises:

an input layer including input features from the sensor data that include each of the following: driving and braking torques, normal loads, slip angles, chassis velocities, and yaw rate as determined by the IMU;

a plurality of processing layers; and an output layer; and wherein the processor is further configured to utilize the neural network model and the physics-based model together as a hybrid model by the processor in generating outputted results of an initial state of the vehicle using both the physics-based model along with ground forces between the vehicle and a ground of a roadway in which the vehicle is travelling to generate the outputted results, and to utilize the outputted results in executing a model predictive control (MPC) for optimizing performance criteria for the neural network model for a predetermined number of steps in a cyclic manner and for executing the control action for movement of the vehicle corresponding to a receding horizon control for the vehicle.

11. The system of claim 10, wherein the control action includes one or more of the following: application of a steering angle for the vehicle, application of a braking torque for the vehicle, or application of a propulsion motor torque for the vehicle.

12. The system of claim 11, wherein the control action includes each of the following: application of the steering angle for the vehicle, application of the braking torque for the vehicle, and application of the propulsion motor torque for the vehicle.

13. The system of claim 10, wherein: the neural network model pertains to vehicle to ground interaction between a plurality of wheels of the vehicle and a ground of a roadway on which the vehicle is travelling; and the neural network model is updated based on application of the physics-based model.

14. The system of claim 13, wherein the neural network model includes a Jacobian matrix that comprises a gradient matrix that is configured to improve efficiency for the neural network model and therefore to improve control of the vehicle.

15. The system of claim 13, wherein the neural network model is trained used the grey-box model along with vehicle simulation data and vehicle test data based on a loss function including separate equations for lateral acceleration and longitudinal acceleration.

16. The system of claim 15, wherein the processor is further configured to at least facilitate developing model based control for the vehicle, based a linear time varying (LTV) approximation of the grey-box model.

17. The system of claim 13, wherein the processor is further configured to at least facilitate implementing the physics-based model by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods comprising one or more model predictive control (MPC) methods, linear quadratic regulator (LQR) methods, or iterative linear quadratic regulator (iLQR) methods.

18. The system of claim 13, wherein the processor is further configured to at least facilitate implementing the physics-based model by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods comprising each of the following: one or more model predictive control (MPC)

methods, one or more linear quadratic regulator (LQR) methods, and one or more iterative linear quadratic regulator (iLQR) methods.

19. A vehicle comprising:

a body;

a drive system, steering system, and braking system configured to control movement of the body;

one or more sensors that are configured to obtain sensor data as to operation of the vehicle, the one or more sensors including an inertial measurement unit (IMU); and a processor that is coupled to the one or more sensors and configured to at least facilitate:

inputting the sensor data into a grey-box model comprising a neural network model for the forces acting on the vehicle and a physics-based model for body motion of the vehicle;

determining a trajectory of the vehicle, using the grey-box model;

determining a control action for movement of the vehicle via one or more of the drive system, steering system, and braking system, based on the grey-box model using the sensor data; and executing the control action for the vehicle, in accordance with instructions provided by the processor;

wherein the neural network model comprises:

an input layer including input features from the sensor data that include each of the following: driving and braking torques, normal loads, slip angles, chassis velocities, and yaw rate as determined by the IMU;

a plurality of processing layers; and an output layer; and wherein the processor is further configured to utilize the neural network model and the physics-based model together as a hybrid model by the processor in generating outputted results of an initial state of the vehicle using both the physics-based model along with ground forces between the vehicle and a ground of a roadway in which the vehicle is travelling to generate the outputted results, and to utilize the outputted results in executing a model predictive control (MPC) for optimizing performance criteria for the neural network model for a predetermined number of steps in a cyclic manner and for executing the control action for movement of the vehicle corresponding to a receding horizon control for the vehicle.

20. The vehicle of claim 19, wherein:

the neural network model pertains to vehicle to ground interaction between a plurality of wheels of the vehicle and a ground of a roadway on which the vehicle is travelling;

the neural network model updated based on application of the physics-based model;

the neural network model includes a Jacobian matrix that comprises a gradient matrix that is configured to improve efficiency for the neural network model and therefore to improve control of the vehicle;

the neural network model is trained used the grey-box model along with vehicle simulation data and vehicle test data based on a loss function including separate equations for lateral acceleration and longitudinal acceleration;

the processor is further configured to at least facilitate model based control for the vehicle, based a linear time varying (LTV) approximation of the grey-box model; and the processor is further configured to at least facilitate implementing the physics-based model by applying torque to each of four corners of the vehicle, via application of the torque to respective wheels at each of the respective corners of the vehicle, and taking outputs of the neural network model and estimates values of a longitudinal acceleration, a lateral acceleration, and a yaw acceleration of the vehicle using one or more model-based control methods comprising one or more model predictive control (MPC) methods, linear quadratic regulator (LQR) methods, or iterative linear quadratic regulator (iLQR) methods.

\* \* \* \* \*